SELECTIVE COMMUNICATION SYSTEM BETWEEN GROUND STATION AND A PLURALITY OF MOBILE STATIONS

Filed Feb. 28, 1947

2 Sheets-Sheet 1

Inventor
LOREN F. JONES

Attorney

Inventor
LOREN F. JONES
By
C. D. Tuska
Attorney

Patented July 4, 1950 2,513,490

UNITED STATES PATENT OFFICE 2,513,490

SELECTIVE COMMUNICATION SYSTEM BETWEEN GROUND STATION AND A PLURALITY OF MOBILE STATIONS

Loren F. Jones, Philadelphia, Pa., assignor to Radio Corporation of America, a corporation of Delaware Application February 28, 1947, Serial No. 731,451

4 Claims. (Cl. 343—10)

This invention relates to systems for communicating from a ground station selectively to any of a plurality of aircraft.

The principal object of the invention is to provide a communication system adapted for use in conjunction with navigation systems of the type described in copending United States patent application Serial Number 607,999½, filed July 31, 1945 by Loren F. Jones, and entitled Radio Navigation System, wherein the visible display produced by a ground-based radio locator system is relayed by television to aircraft within the service area of the ground station. The system described in said copending application is also generally described in an article entitled "Teleran: Air Navigation and Traffic Control by Means of Television and Radar," published in RCA Review, vol. VII, No. 4, December 1946, pps. 601–621.

A further object is to provide a system of communication requiring only a single carrier frequency for selective communication with any one of a plurality of aircraft.

Another object is to increase the rapidity with which communication may be established, by eliminating the use of the communication channel for calling or otherwise identifying the craft to be communicated with.

Figures 1, 2:
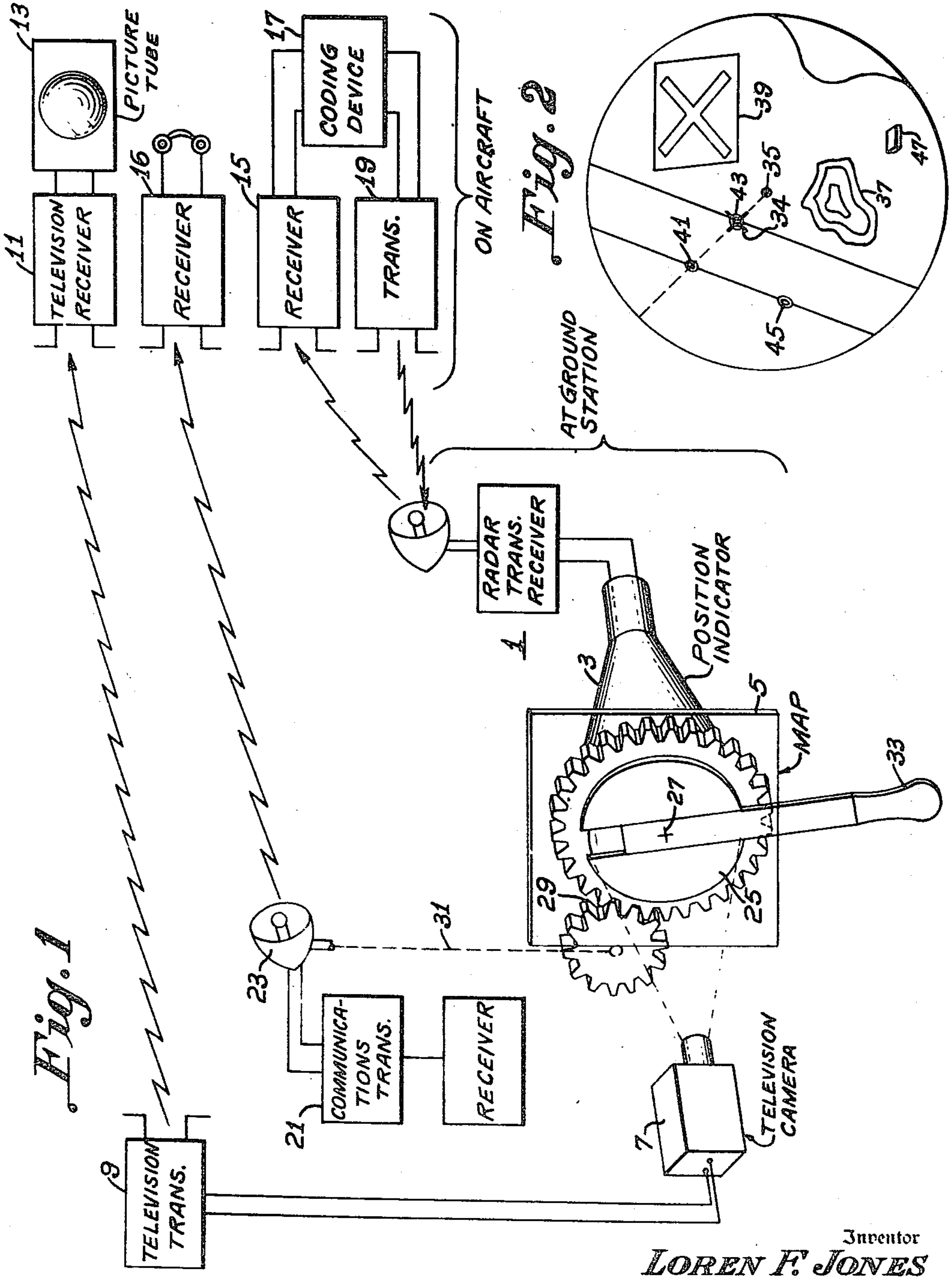
Figure 3:
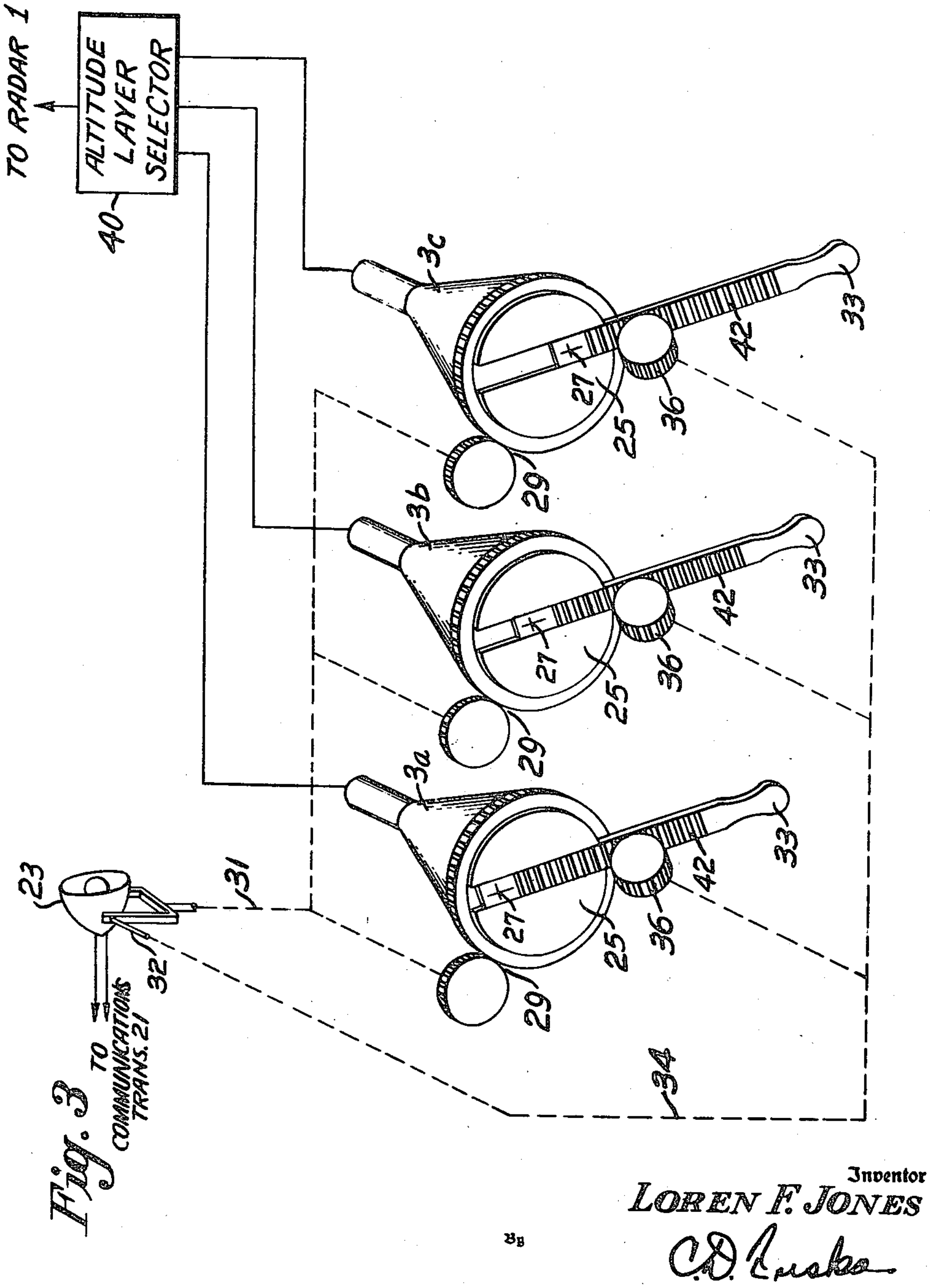

The invention will be described with reference to the accompanying drawing wherein:

Figure 1 is a schematic block diagram of a navigation system embodying the invention, Figure 2 is an illustration of a typical display appearing on an aircraft in the operation of the system of Figure 1 and Figure 3 is a schematic diagram showing a modification of the system of Figure 1.

Referring to Figure 1, the ground station includes a radar system generally designated by the numeral 1 and provided with a cathode ray position indicator tube 3. A translucent map 5 is placed over the face of the tube 3, and shows the air routes surrounding the ground station, traffic control instructions or other information. A television camera 7 is directed at the tube 3 and the map 5, and is connected to a television broadcast transmitter 9.

Each aircraft using the complete system is equipped with a television receiver 11, responsive to the ground station television transmitter 9 to reproduce the display picked up by the camera 7 on a picture tube 13. In addition, each aircraft may carry a radar "transponder" beacon, comprising a receiver 15 responsive to the signals sent out by the radar system 1, a coding device 17 for modifying the received signals in a manner characteristic of the particular craft or of the altitude at which it is flying, and a transmitter 19 for sending the modified signals back to the radar station. The system thus far described is substantially the same as that described in more detail in said copending Jones application Serial Number 607,999½.

In order to provide for communication from the ground station to aircraft within the service area, a communications transmitter 21 is located in the vicinity of the radar system 1. The transmitter 21 has a sharply directive antenna 23. A receiver 16 responsive to the frequency of the transmitter 21 is provided on each aircraft. For two way communication, the aircraft will be equipped with a transmitter and a ground receiver will be provided.

In front of and independent of the map 5 is a transparent disk 25, provided with a slot or other means for supporting and guiding a transparent cursor 27. The cursor 27 is provided with an opaque cross or similar index. By means of the cursor handle, the disk 25 is rotatable about its center, which coincides with the axis of the indicator tube 3 and is mechanically coupled to the antenna 23 through gearing 29 and a shaft or equivalent means, designated by the dash line 31. The arrangement is such that when the disk 25 is positioned so that the line of motion of the cursor 27 extends through a "pip" on the tube 3, the antenna 23 is directed toward the corresponding aircraft. If the antenna beam is fan shaped, i. e., narrow in azimuth and broad in elevation, the signals will reach the aircraft at both low and high altitudes.

In the operation of the system, the disk 25 and the cursor 27 are adjusted by means of a handle 33 to place the index mark over the pip in the radar display representing the craft with which communication is to be made. The index mark will appear on the picture tube 13, as shown at 34 in Figure 2. The point 35 represents the location of the ground station. The diagrams 37 and 39 show map details. Various "pips" indicating the positions of different aircraft appear at 41, 43, 45 and 47.

The operator on the craft corresponding to the pip 43 will see the index mark over his pip, and will know that he is about to receive a message. The operator on the craft at the position 41, in line with the craft 43 and the ground station, will know that he will hear the message but that it is not for him. Other craft, at other bearings from the ground station, will not hear the message.

To direct the message more specifically to a single aircraft, a sharp conical or "pencil" beam may be used in place of the fan beam. Referring to Figure 3, the antenna 23, in addition to being rotatable in azimuth, is also movable in elevation about the horizontal axis of a shaft 32. A plurality of cathode ray tubes 3a, 3b, and 3c are connected to the radar 1 through an altitude layer selector 40 of the type described in the aforementioned Jones application so that each tube provides a display depicting only the aircraft within a respective altitude layer. The shaft 32 is coupled to pinions 36 engaging racks 42 on the cursors associated with the tubes 3a, 3b, and 3c.

The elevation angle of the antenna 23 will be controlled by the radial position of whichever one of the cursors 27 is in use. Since any one of the tubes 3a, 3b, and 3c will show only pips representing aircraft in respective altitude layers, the distance of a particular pip from the center of the display is an approximate measure of the elevation angle. By placing the index of the cursor over the aircraft pip, as indicated by 34 and 43 of Figure 2, the antenna is raised to the proper elevation.

It is apparent that the selective communication system described above will operate in conjunction with any ground surveillance radar, without the use of any equipment in the aircraft except for the receiver 18, providing the pictorial presentation of Figure 2 is not needed. If a fan beam is used, the cursor need move only in rotation. If a sharp conical beam is used, the radial motion of the cursor will have to be retained, and altitude information, whether obtained by radar or otherwise, must be combined with distance information (i. e. the radial position of the cursor), to control the elevation angle of the antenna 23.

I claim as my invention:

1. In a radio navigation system including a ground station, radio locator means at said station including means providing a map-like display indicating the positions and relative altitudes of aircraft within the service area of said station, and television means reproducing said display on said aircraft, a system for selective communication from said ground station to any of said craft, including a visible index and means for superimposing said index over the point on said display corresponding to the position of the selected craft; directive transmitter means at said ground station, and means for controlling the direction and elevation of transmission of said directive transmitter means in accordance with the position of said index on said display.

2. In a radio navigation system including a ground station, radio locator means for indicating visually the positions of aircraft within the service area of said ground station, a system for communicating from said ground station selectively to any of said aircraft, including a directive transmitter at said ground station, means for superimposing on said visual display of position indications at said ground station a further indication of the position of the craft to which communication is to be made, and means responsive to the position of said further indication on said display to control the direction of transmission of said directive transmitter and television pickup and transmitter means for broadcasting to said aircraft a television signal corresponding to the visual indications afforded by said radio locator means and said further indication, and television receiver means on said aircraft for reproducing said indications thereon.

3. In a radio navigation system including a ground station, a radio locator system at said ground station including means providing a plurality of map-like displays, corresponding to different altitude layers, of the positions of aircraft within the service area of said station, a system for selective communication from said ground station to any of said craft, including a visible index and means for superimposing said index over the point on one of said map-like displays corresponding to the position of the selected craft; directive transmitter means at said ground station, and means for controlling the azimuth and elevation of the direction of transmission of said directive transmitter means in accordance with the position of said index on said display.

4. In a radio navigation system including a ground station, a radio locator system at said ground station including means providing a plurality of map-like displays, corresponding to different altitude layers, of the positions of aircraft within the service area of said station and television means reproducing on each of said aircraft the display corresponding to the altitude layer in which it is flying, a system for selective communication from said ground station to any of said craft, including a visible index and means for superimposing said index over the point on one of said map-like displays corresponding to the position of the selected craft; directive transmitter means at said ground station, and means for controlling the azimuth and elevation of the direction of transmission of said directive transmitter means in accordance with the position of said index on said display.

LOREN F. JONES.

REFERENCES CITED

The following references are of record in the file of this patent:

UNITED STATES PATENTS

| Number | Name | Date |
|---|---|---|
| 733,910 | Ladd | July 14, 1903 |
| 2,027,527 | Hammond | Jan. 14, 1936 |
| 2,027,528 | Hammond | Jan. 14, 1936 |
| 2,152,329 | Schussel | Mar. 28, 1939 |
| 2,234,244 | Gossel | Mar. 11, 1941 |
| 2,307,029 | Elm | Jan. 5, 1943 |
| 2,395,966 | Goldberg | Mar. 5, 1946 |
| 2,401,759 | Hersey | June 11, 1946 |
| 2,459,481 | Wolff et al. | Jan. 18, 1949 |

OTHER REFERENCES

"Radio News," pp. 664, 665, 684, 685, May 1937.